United States Patent
Meyers

(10) Patent No.: US 10,960,817 B2
(45) Date of Patent: Mar. 30, 2021

(54) VEHICLE AUTOMATED AUDIO REMINDER APPARATUS

(71) Applicant: Christopher Meyers, Ft Worth, TX (US)

(72) Inventor: Christopher Meyers, Ft Worth, TX (US)

( * ) Notice: Subject to any disclaimer, the term of this patent is extended or adjusted under 35 U.S.C. 154(b) by 0 days.

(21) Appl. No.: 16/538,609

(22) Filed: Aug. 12, 2019

(65) Prior Publication Data

US 2021/0046867 A1   Feb. 18, 2021

(51) Int. Cl.
| | | |
|---|---|---|
| *B60Q 1/00* | (2006.01) | |
| *B60Q 9/00* | (2006.01) | |
| *G08B 21/24* | (2006.01) | |
| *G08B 21/02* | (2006.01) | |
| *H04R 1/02* | (2006.01) | |

(52) U.S. Cl.
CPC ............. *B60Q 9/00* (2013.01); *G08B 21/02* (2013.01); *G08B 21/24* (2013.01); *H04R 1/025* (2013.01); *H04R 2499/13* (2013.01)

(58) Field of Classification Search
CPC .......... B60Q 9/00; G08B 21/02; G08B 21/24; H04R 1/025; H04R 2499/13
USPC .......................................................... 340/457
See application file for complete search history.

(56) References Cited

U.S. PATENT DOCUMENTS

| | | | | |
|---|---|---|---|---|
| 4,987,403 A | * | 1/1991 | Apfel .................. | B60R 11/00 340/309.16 |
| 6,535,137 B1 | | 3/2003 | Ryan | |
| 6,870,472 B2 | | 3/2005 | Gift | |
| 6,909,365 B2 | | 6/2005 | Toles | |
| 7,012,533 B2 | * | 3/2006 | Younse ................ | B60N 2/002 180/273 |
| 7,378,974 B1 | * | 5/2008 | Bassett ................ | G08B 21/02 340/573.1 |
| 8,847,747 B2 | | 9/2014 | Bloukos | |
| 10,127,794 B1 | * | 11/2018 | Britt .................... | B60N 2/002 |
| 10,442,353 B1 | * | 10/2019 | Norman ............... | B60N 2/26 |
| 2004/0121645 A1 | * | 6/2004 | Postrel ................ | H04M 1/6083 439/374 |
| 2006/0103516 A1 | | 5/2006 | Zang | |
| 2006/0103525 A1 | | 5/2006 | Alger | |
| 2006/0273917 A1 | | 12/2006 | Rams, Jr. | |
| 2007/0069902 A1 | | 3/2007 | Garrett | |
| 2007/0222622 A1 | | 9/2007 | Sweeney | |
| 2007/0229243 A1 | | 10/2007 | Welch | |
| 2008/0055064 A1 | | 3/2008 | Keith | |

(Continued)

*Primary Examiner* — Naomi J Small

(57) ABSTRACT

A vehicle automated audio reminder apparatus for reminding parents to check for children and pets when exiting a vehicle includes a housing defining a housing cavity. A front side of the housing has a speaker aperture and a button aperture each extending through to the housing cavity. A first and second engagement member couple the housing under a dash panel of a vehicle. A speaker is coupled to the housing within the speaker aperture and a microphone is coupled within the speaker. A record button is coupled within the button aperture. A digital recorder is coupled within the housing cavity to stores an audio message through the microphone when the record button is depressed and reproduce the audio message through the speaker when activated. A microprocessor activates the digital recorder when a door of the vehicle is opened.

5 Claims, 3 Drawing Sheets

(56) References Cited

U.S. PATENT DOCUMENTS

| | | | |
|---|---|---|---|
| 2011/0080288 A1* | 4/2011 | Younse | B60N 2/2881 |
| | | | 340/573.1 |
| 2012/0154136 A1 | 6/2012 | Connelly, Jr. | |
| 2014/0266662 A1 | 9/2014 | Matos | |
| 2016/0042616 A1 | 2/2016 | Dorsey | |
| 2016/0090098 A1* | 3/2016 | Kim | G08B 21/22 |
| | | | 701/48 |
| 2016/0144783 A1* | 5/2016 | Mroczek | B60N 2/28 |
| | | | 340/457 |
| 2017/0197547 A1* | 7/2017 | Salinas, Jr. | G08B 21/24 |
| 2020/0023770 A1* | 1/2020 | Kim | B60Q 1/00 |

* cited by examiner

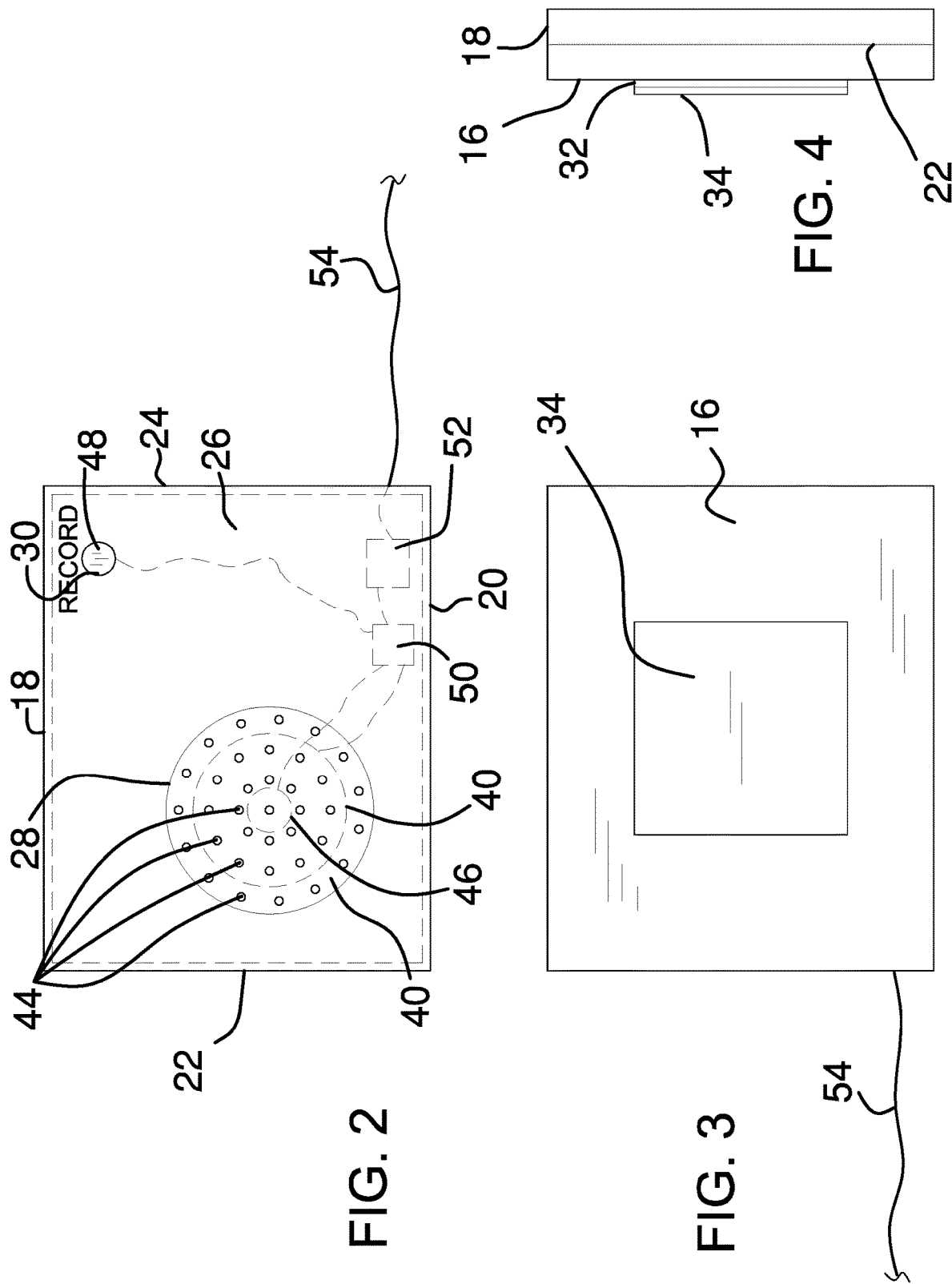

VEHICLE AUTOMATED AUDIO REMINDER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to child safety devices and more particularly pertains to a new child safety device for reminding parents to check for children and pets when exiting a vehicle.

(2) Description of Related Art Including Information Disclosed Under 37 CFR 1.97 and 1.98

The prior art relates to child safety devices.

BRIEF SUMMARY OF THE INVENTION

An embodiment of the disclosure meets the needs presented above by generally comprising a housing having a front side, a back side, a top side, a bottom side, a left side, and a right side defining a housing cavity. The front side of the housing has a speaker aperture and a button aperture each extending through to the housing cavity. A first engagement member is coupled to the back side and a second engagement member is selectively engageable with the first engagement member. The second engagement member is configured to be coupled under a dash panel of a vehicle. A speaker is coupled to the housing within the speaker aperture. A microphone is coupled within the speaker. A record button is coupled to the housing within the button aperture. A digital recorder is coupled within the housing cavity and is in operational communication with each of the speaker, the microphone, and the record button. The digital recorder stores an audio message through the microphone when the record button is depressed and reproduces the audio message through the speaker when activated. A microprocessor is coupled within the housing cavity and is in operational communication with the digital recorder. The microprocessor has a power wire extending out of the housing and configured to be connected to a dome light circuitry of the vehicle to activate the digital recorder when a door of the vehicle is opened.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a front elevation view of an embodiment of the disclosure.

FIG. 3 is a rear elevation view of an embodiment of the disclosure.

FIG. 4 is a side elevation view of an embodiment of the disclosure.

DETAILED DESCRIPTION OF THE INVENTION

Figure 1:
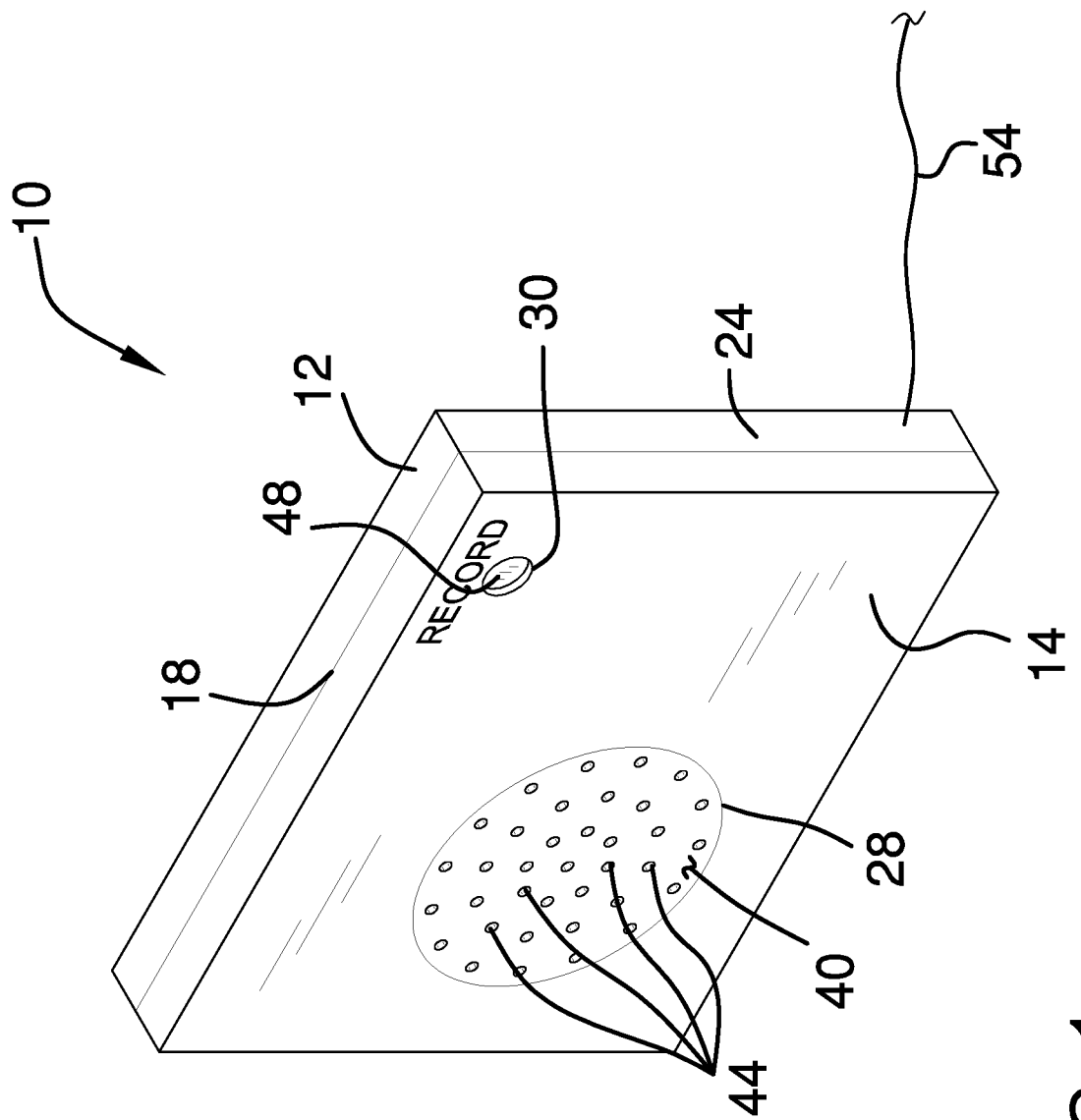
FIG. 1 is an isometric view of a vehicle automated audio reminder apparatus according to an embodiment of the disclosure.
Figure 5:
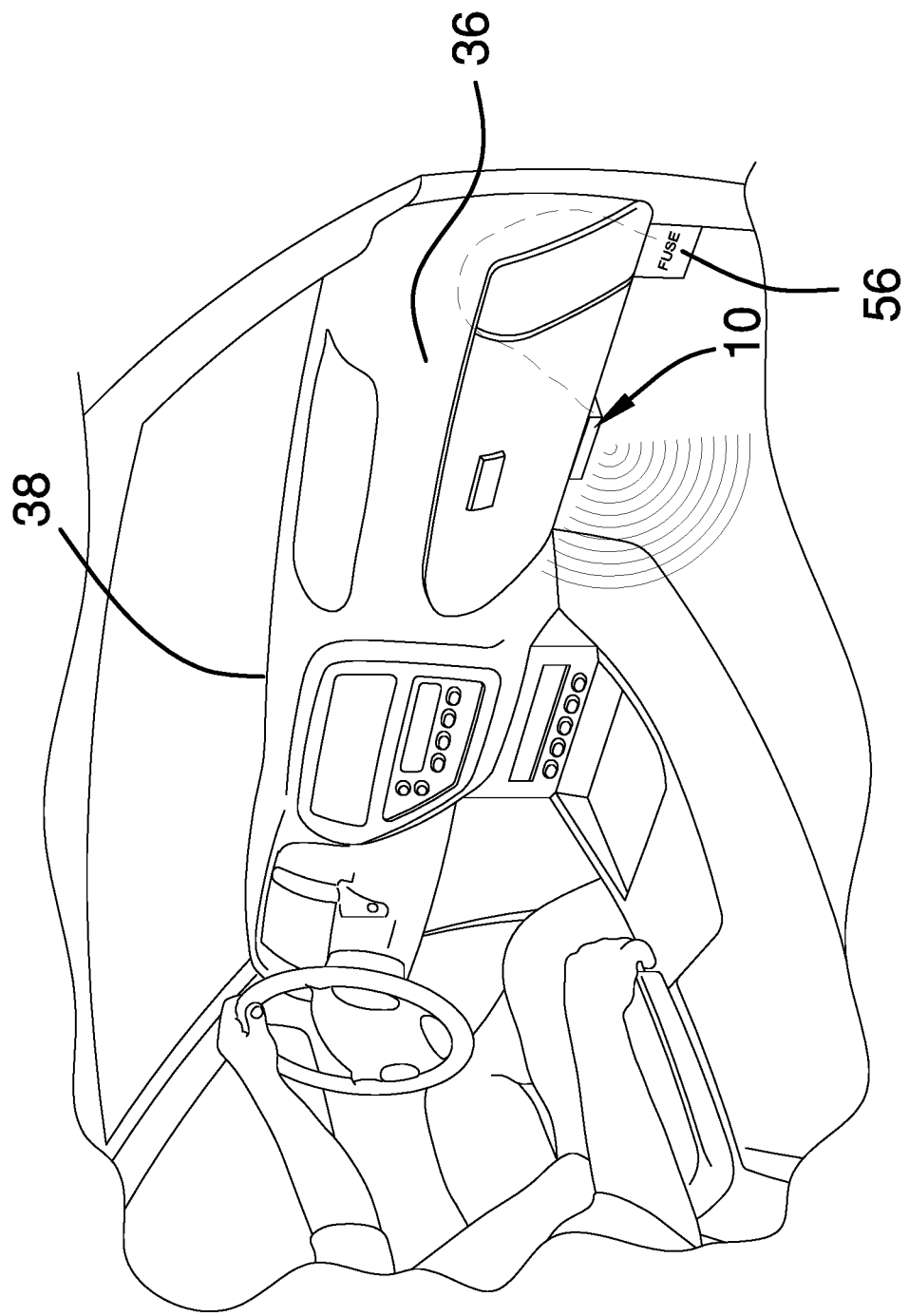
FIG. 5 is an in-use view of an embodiment of the disclosure.

With reference now to the drawings, and in particular to FIGS. 1 through 5 thereof, a new child safety device embodying the principles and concepts of an embodiment of the disclosure and generally designated by the reference numeral 10 will be described.

As best illustrated in FIGS. 1 through 5, the vehicle automated audio reminder apparatus 10 generally comprises a housing 12 having a front side 14, a back side 16, a top side 18, a bottom side 20, a left side 22, and a right side 24 defining a housing cavity 26. The front side 14 of the housing has a speaker aperture 28 and a button aperture 30 each extending through to the housing cavity 26. A first engagement member 32 is coupled to the back side 16 and a second engagement member 34 is selectively engageable with the first engagement member 32. The second engagement member 34 is configured to be coupled under a dash panel 36 of a vehicle 38. The first engagement member 34 and the second engagement member 36 may be square hook-and-loop fasteners. The second engagement member 34 may semi-permanently adhere to the dash panel 36.

A speaker 40 has a round grille 42 coupled within the speaker aperture 28. The grille 42 has a plurality of grille apertures 44 extending therethrough. A microphone 46 is coupled within the speaker 40. A record button 48 is coupled to the housing 12 within the button aperture 30. The record button 48 may be recessed from the front side 14 of the housing within the button aperture 30 to prevent accidental depression. A digital recorder 50 is coupled within the housing cavity 26 and is in operational communication with each of the speaker 40, the microphone 46, and the record button 48. The digital recorder 50 stores an audio message through the microphone 46 when the record button 48 is depressed and reproduces the audio message through the speaker 40 when activated. A microprocessor 52 is coupled within the housing cavity 26 and is in operational communication with the digital recorder 50. The microprocessor 52 has a power wire 54 extending out of the housing 12 and configured to be connected to a dome light circuitry 56 of the vehicle to activate the digital recorder 50 when a door of the vehicle 38 is opened.

In use, the second engagement member 34 is coupled to the dash panel 36 and the power wire 54 is connected to the dome light circuitry 56. The record button 48 is depressed using a pen or other small object and a desired audio message is spoken into the microphone 46 and saved to the digital recorder 50. The audio message may be "check the back seat for children or pets" or another message to a similar effect to prevent children and pets from being left in a vehicle. The first engagement member 32 is engaged with the second engagement member 34 to keep the apparatus 10 stored safely and out of sight beneath the dash panel 36. When any door of the vehicle 38 is opened, the dome light circuitry 56 is powered on and the microprocessor 52 activates the digital recorder 50 to reproduce the audio message through the speaker 40.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle automated audio reminder apparatus comprising:
   a housing, the housing having a front side, a back side, a top side, a bottom side, a left side, and a right side defining a housing cavity, the front side of the housing having a speaker aperture and a button aperture each extending through to the housing cavity;
   a first engagement member coupled to the housing, the first engagement member being coupled to the back side;
   a second engagement member, the second engagement member being selectively engageable with the first engagement member and being configured to be coupled under a dash panel of a vehicle;
   a speaker coupled to the housing, the speaker being coupled within the speaker aperture;
   a microphone coupled to the speaker, the microphone being coupled within the speaker;
   a record button coupled to the housing, the record button being coupled within the button aperture;
   a digital recorder coupled to the housing, the digital recorder being coupled within the housing cavity and being in operational communication with each of the speaker, the microphone, and the record button, the digital recorder storing an audio message through the microphone when the record button is depressed and reproducing the audio message through the speaker when activated; and
   a microprocessor coupled to the housing, the microprocessor being coupled within the housing cavity and being in operational communication with the digital recorder, the microprocessor having a power wire extending out of the housing and being configured to be connected to a dome light circuitry of the vehicle, activating the digital recorder when a door of the vehicle is opened.

2. The vehicle automated audio reminder apparatus of claim 1 further comprising the first engagement member and the second engagement member being hook-and-loop fasteners.

3. The vehicle automated audio reminder apparatus of claim 1 further comprising the speaker having a round grille coupled within the speaker aperture, the grille having a plurality of grille apertures extending therethrough.

4. The vehicle automated audio reminder apparatus of claim 1 further comprising the record button being recessed from the front side of the housing within the button aperture.

5. A vehicle automated audio reminder apparatus comprising:
   a housing, the housing having a front side, a back side, a top side, a bottom side, a left side, and a right side defining a housing cavity, the front side of the housing having a speaker aperture and a button aperture each extending through to the housing cavity;
   a first engagement member coupled to the housing, the first engagement member being coupled to the back side;
   a second engagement member, the second engagement member being selectively engageable with the first engagement member and being configured to be coupled under a dash panel of a vehicle, the first engagement member and the second engagement member being hook-and-loop fasteners;
   a speaker coupled to the housing the speaker having a round grille coupled within the speaker aperture, the grille having a plurality of grille apertures extending therethrough;
   a microphone coupled to the speaker, the microphone being coupled within the speaker;
   a record button coupled to the housing, the record button being coupled within the button aperture, the record button being recessed from the front side of the housing within the button aperture;
   a digital recorder coupled to the housing, the digital recorder being coupled within the housing cavity and being in operational communication with each of the speaker, the microphone, and the record button, the digital recorder storing an audio message through the microphone when the record button is depressed and reproducing the audio message through the speaker when activated; and a microprocessor coupled to the housing, the microprocessor being coupled within the housing cavity and being in operational communication with the digital recorder, the microprocessor having a power wire extending out of the housing and being configured to be connected to a dome light circuitry of the vehicle, activating the digital recorder when a door of the vehicle is opened.

\* \* \* \* \*